Figure 1:
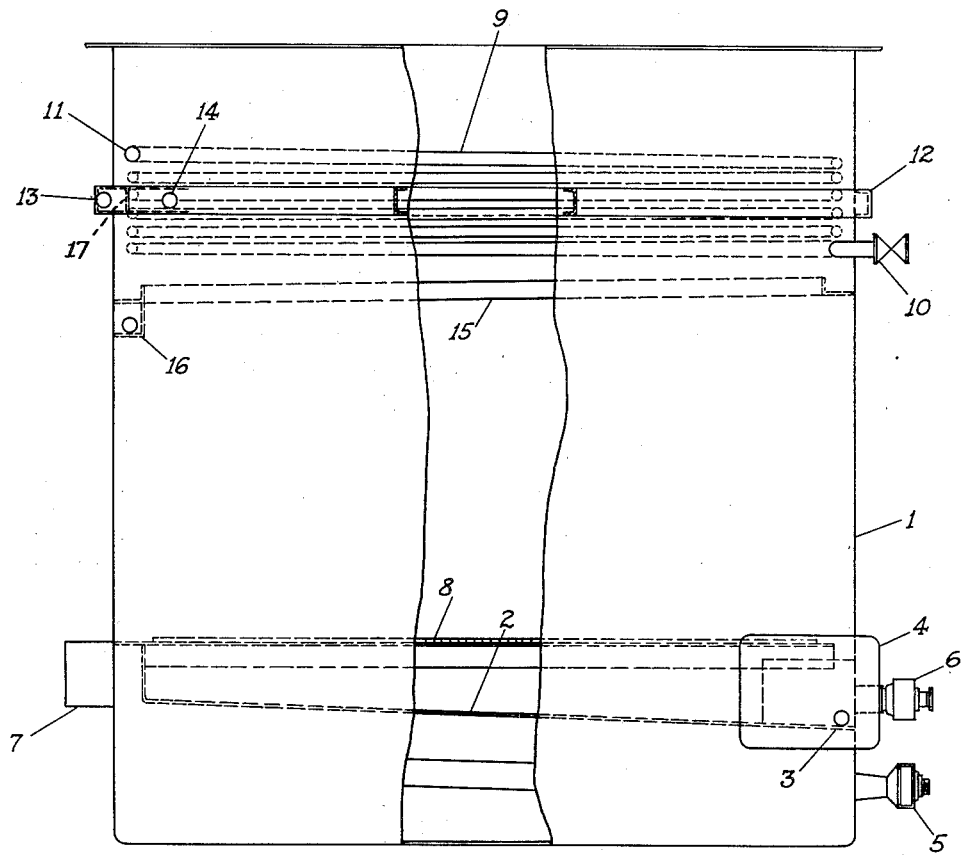

Aug. 24, 1937.　　　　J. SAVAGE　　　　2,091,187

DEGREASING APPARATUS

Filed March 22, 1934

INVENTOR.
Joseph Savage

BY
P. M. Paulson.
ATTORNEY.

Patented Aug. 24, 1937

2,091,187

UNITED STATES PATENT OFFICE 2,091,187

DEGREASING APPARATUS

Joseph Savage, Runcorn, England, assignor to Imperial Chemical Industries Limited, a corporation of Great Britain Application March 22, 1934, Serial No. 716,842
In Great Britain March 30, 1933

3 Claims. (Cl. 87—6)

This invention relates to apparatus used in the degreasing of materials with the aid of volatile solvents.

The process of degreasing materials, especially metal goods, by means of volatile grease solvents such as, for example, trichlorethylene, is well known and a number of types of apparatus have been devised for carrying out the operation in the solvent vapour or in a volume of heated solvent. A prominent feature of these various types is the provision of condensing surfaces in the upper portion of the apparatus. These condensing surfaces usually take the form of coils through which water is circulated and which are arranged around the walls of the vessel containing the materials under treatment.

The object of the condensing surfaces is to prevent the escape of vapour from the apparatus, with the consequent wastage. As regards the bulk of the solvent vapour this object is achieved with a considerable amount of success when solvents such as trichlorethylene are used, as visual observation shows the vapour to have a well defined horizontal surface. The height of this surface, which may be referred to as the vapour line, is controlled by the action of the condensing surfaces or cooling coils.

In the operation of apparatus adapted to be open to the atmosphere during working, the condensing surfaces already mentioned do not, however, prevent completely the loss of solvent. It will be obvious that the air in contact with the surface of the solvent vapour will tend to become saturated with such vapour, consequently any flow of air into or out of the apparatus will tend to cause losses of solvent which cannot be prevented by means of the condensing surfaces. Such flow of air may be due to convection currents or to the insertion or removal of the materials under treatment.

I have now found that a considerable proportion of this solvent loss in degreasing apparatus using solvent vapour, or a volume of heated volatile solvent liquid, and having condensing surfaces for controlling the vapour line, can be avoided by maintaining the confining walls of the apparatus which are above the vapour line at approximately atmospheric temperature. In this way the upward convection air currents near the inside walls of the apparatus are eliminated.

As an example of the way in which I may do this I provide above the vapour line an additional cooling coil encircling the walls of the apparatus and maintained in good thermal contact therewith, for example, by soldering or welding on the outside. Provision is made for the supply of cooling water which may, if desired, be passed subsequently to the cooling coils or condensing surfaces controlling the vapour line.

Figure 2:
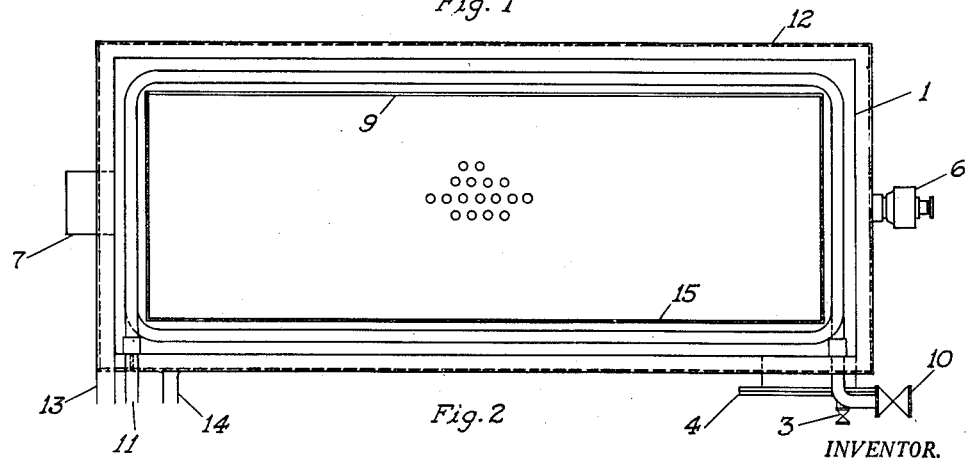

An example of this form of construction is shown in the accompanying drawing in which Figure 1 is an elevation, one side being partly broken away, of a degreasing plant adapted for vapour phase degreasing, and Fig. 2 a plan of the same apparatus. In the drawing 1 represents a rectangular tank which may be constructed of galvanized sheet iron and, if desired, may be provided with a cover (not shown) to prevent evaporation and waste of solvent when the plant is standing idle.

At the bottom of the tank there is provided a sump 2, for the volatile solvent. Preferably the sump is provided with a sloping floor draining to the outlet valve 3, and with a cleaning door 4. Means are provided for heating the solvent in the sump; in the present case a gas burner 5, is illustrated but any other convenient source of heat such as an electrical heater or steam coils could be used. I also find it is desirable to arrange for thermostatic control of the heating, this being indicated at 6, and by this means I avoid excessive heating of the solvent and accumulated oil in the sump tending to cause decomposition of these materials. When a gas burner is used for heating, an outlet 7 is provided for the waste gases from the burner.

Immediately above the sump, a perforated plate 8 is placed to serve as a support for the goods to be degreased. Above the perforated plate a considerable "vapour space" is arranged for, in which the goods remain while under treatment. The volume of this space is fixed by the condensing coils 9 which extend around the tank 1 and are fixed close to the walls. These coils are provided with an inlet 10 and outlet 11 for cooling water. In operation they serve to control the upper limit or vapour line of heavy vaporized grease solvents such as trichlorethylene. With an adequate supply of cooling water it is a matter of no difficulty to ensure that the vapour line does not rise more than half way up the coils.

Immediately above the normal level of the vapour line a channel 12 is welded to the outer surface of the tank 1. This channel is provided with an inlet 13 and an outlet 14 for cooling water and to ensure circulation of the water in the proper manner the channel is furnished with a partition 17. The water in the channel 12 serves to maintain the walls of the top portion of the tank 1, above the level of the channel, at substantially atmospheric temperature and without a temperature gradient. In this way convection currents close to the walls of the tank are prevented and the loss of solvent due to air currents is minimized.

I also find it is preferable to provide immediately below the condensing coils 9, a gutter 15 around the walls of the tank. Normally the condensate from the coils collects in the gutter and overflows, running back into the sump 2. A drain cock is provided at 16, whereby the condensate can be drawn off into an outside container. By this means a supply of clean solvent may be collected when the liquid in the sump becomes fully charged with oily impurities. When all the condensate has been collected the oily matter is cleaned out from the sump and the plant recharged with the clean condensate and fresh solvent required to make up any losses.

To illustrate the saving which is achieved by the present invention, comparative tests were made before and after fitting an apparatus with the cold channel 12 shown in the drawing. In each case a total working time of 13½ hours was taken for the test. During this time 117 charges of oily metal each weighing 3 cwts. were treated, i. e. 17 tons 11 cwts. of metal parts were degreased in each test. The solvent used for degreasing was trichlorethylene and the amount used in each case was carefully weighed into the apparatus. After the tests the oily solvent was carefully distilled under identical conditions and the condensate weighed. In the test made before fitting the cold channel, there was a loss of 63 lbs. 13 ozs. of solvent, while on the second test with the cold channel in operation the loss only amounted to 44 lbs. 3 ozs. This represents a saving of 32% in the consumption of solvent, which means that the amount of material treated for a given consumption of solvent is increased by 46%.

I am aware that a degreasing apparatus has already been described in which the upper part of the vessel containing the materials under treatment is provided with double walls serving as a cooling jacket. However, this arrangement does not prevent convection currents because the vapour line fluctuates slightly and the walls of the cooling jacket thus exhibit a temperature gradient. Moreover, such an arrangement of double walls does not permit of such efficient use of the cooling water as does the conventional arrangement of cooling surfaces in the form of coils such as I prefer to use in conjunction with my novel cold channel.

I claim:

1. In a degreasing apparatus, a vessel adapted to contain a volume of solvent vapor, a peripheral conduit for cooling fluid in thermal contact with the upper portion of the walls of said vessel, and condensing means positioned inside said vessel to condense solvent vapor, at least a portion of said condensing means being adapted to function below said conduit.

2. In a degreasing apparatus, a vessel adapted to contain a volume of solvent vapor, a peripheral conduit for cooling fluid in thermal contact with the upper portion of the walls of said vessel, said conduit being relatively small in comparison with the walls, and condensing means positioned inside said vessel to condense solvent vapor, a portion of said condensing means being adapted to function below said conduit and a portion above said conduit.

3. An apparatus for degreasing materials comprising, in combination, a vessel for receiving the materials to be degreased, said vessel being adapted to contain a volume of degreasing solvent vapor, cooling means for maintaining cooling fluid in thermal contact with the upper portion of the walls of said vessel, condensing means separate from said cooling means for condensing solvent vapor and controlling the level thereof in said vessel, at least a portion of said condensing means being adapted to function below said cooling means, cooling fluid inlet and outlet conduits for said condensing means, and cooling fluid inlet and outlet conduits separate from said first named conduits for conducting cooling fluid to said cooling means.

JOSEPH SAVAGE.